United States Patent
Arrigoni et al.

(10) Patent No.: US 12,429,584 B2
(45) Date of Patent: Sep. 30, 2025

(54) PRESENCE DETECTION WITH SIGNAL REGULARIZATION AND EDGE DETECTION

(71) Applicant: STMicroelectronics International N.V., Geneva (CH)

(72) Inventors: Piergiorgio Arrigoni, Domodossola (IT); Stefano Paolo Rivolta, Desio (IT); Marco Bianco, Cesano Boscone (IT)

(73) Assignee: STMicroelectronics International N.V., Geneva (CH)

(*) Notice: Subject to any disclaimer, the term of this patent is extended or adjusted under 35 U.S.C. 154(b) by 260 days.

(21) Appl. No.: 18/308,581

(22) Filed: Apr. 27, 2023

(65) Prior Publication Data
US 2024/0329245 A1   Oct. 3, 2024

Related U.S. Application Data

(60) Provisional application No. 63/492,325, filed on Mar. 27, 2023.

(51) Int. Cl.
*G01S 17/04* (2020.01)

(52) U.S. Cl.
CPC .................... *G01S 17/04* (2020.01)

(58) Field of Classification Search
CPC ............... G01S 17/04; G08B 13/191; G06T 2207/10016; G06T 7/20; G06V 20/00; G06V 20/46; G06V 10/25; G06V 20/41; G06V 20/52; G06V 40/161; H04N 7/188; H04N 7/183
See application file for complete search history.

(56) References Cited

U.S. PATENT DOCUMENTS

| | | | |
|---|---|---|---|
| 5,870,022 A | 2/1999 | Kuhnly et al. | |
| 6,272,411 B1 | 8/2001 | Corrado et al. | |
| 7,796,780 B2 | 9/2010 | Lipton et al. | |
| 8,311,370 B2 | 11/2012 | Ha et al. | |
| 11,704,908 B1* | 7/2023 | Xu | G06V 40/172 |
| | | | 382/181 |
| 11,808,633 B2* | 11/2023 | Wang | H10N 10/817 |
| 2013/0112878 A1 | 5/2013 | Zhao et al. | |

(Continued)

FOREIGN PATENT DOCUMENTS

| | | |
|---|---|---|
| JP | 4366807 B2 | 11/2009 |
| JP | 2014202614 A | 10/2014 |
| WO | WO 2021209420 A1 | 10/2021 |

OTHER PUBLICATIONS

Tomer et al. "CMOS-SOI-MEMS Uncooled Infrared Security Sensor With Integrated Readout", Journal of The Electron Devices Society, vol. 4, No. 3, May 2016, p. 155-162. (Year: 2016).*

(Continued)

*Primary Examiner* — David P Porta
*Assistant Examiner* — Mamadou Faye
(74) *Attorney, Agent, or Firm* — Seed Intellectual Property Law Group LLP

(57) ABSTRACT

The present disclosure is directed to human presence detection with an infrared sensor. The human presence detection utilizes signal regularization and edge detection to minimize the effect of drift on the human presence detection. The human presence detection is accurate regardless of changes in ambient temperatures.

18 Claims, 2 Drawing Sheets

(56) References Cited

U.S. PATENT DOCUMENTS

2015/0186733 A1* 7/2015 Hayakawa ............. G06V 20/58
 382/103
2022/0319300 A1 10/2022 Stewart et al.
2022/0361475 A1* 11/2022 Bachman ............. G06T 7/0002

OTHER PUBLICATIONS

Moisello et al., "Thermal Sensors for Contactless Temperature Measurements, Occupancy Detection, and Automatic Operation of Appliances during the COVID-19 Pandemic: A Review," *Micromachines* (*Basel*) *12*(2):148, Feb. 2021. (28 pages).

* cited by examiner

PRESENCE DETECTION WITH SIGNAL REGULARIZATION AND EDGE DETECTION

BACKGROUND

Technical Field

The present disclosure is directed to human presence detection.

Description of the Related Art

Human presence detection is becoming increasingly popular for a variety of applications. For example, electronic devices, such as personal electronics, domestic appliances, vehicles, and building access management systems, incorporate human presence detection for user and room occupancy detection.

Past human presence detection systems often utilized infrared sensors to perform presence detection based on motion detection. However, such systems are not reliable in detecting continuous human presence.

Unfortunately, infrared sensors are susceptible to changes in the ambient temperature. The presence of heat sources (e.g., sunlight, heaters, etc.) and cold sources (e.g., coolers, refrigerators, etc.) causes drift in the detection signal of the infrared sensor (e.g., all measurements by the infrared sensor are increased or decreased independently by human presence). As the drift is due to changing temperature conditions in the field of view (FoV) of the infrared sensor and not in the surrounding environment of the device, current ambient compensation techniques are ineffective in minimizing the drift.

If the drift is substantial, the detection signal incorrectly triggers threshold values used to trigger a human presence condition indicating the presence of a human and a human absence condition indicating an absence of a human. Consequently, a human presence condition may be reported even if no one is present in the FoV of the infrared sensor (a false positive), and a human absence condition may be reported even if a person is present in the FoV of the infrared sensor (a false negative). As a result, detection results of the human presence detection become unreliable and inaccurate.

BRIEF SUMMARY

The present disclosure is directed to human presence detection with an infrared sensor, more specifically a thermal metal-oxide-semiconductor (TMOS) infrared sensor. The human presence detection utilizes signal regularization and edge detection to minimize the effect of drift on the human presence detection. The human presence detection is accurate regardless of changes in ambient temperature.

An electronic device with human presence detection includes, in part, a signal regulator, an edge detector, and a presence detector.

The signal regulator implements regularization of a detection signal generated by the infrared sensor by determining the mean of the detection signal in each of pre-defined non-overlapping time windows.

The edge detector starts incrementing (or decrementing) an edge adder signal by a value of a step of the regulated detection signal in response to determining the absolute value of the step of the regulated detection signal exceeds an edge start threshold. The edge detector stops incrementing (or decrementing) the edge adder signal in response to determining an absolute value of a step of the regulated detection signal is less than an edge end threshold or in response to a sign of a value of a step not being the same as a sign of the value of a first step of an edge.

The presence detector detects a true absence state, which indicates no person is present, and a presence state, which indicates a person is present, based on the edge adder signal. The presence detector detects the true absence state in response to determining the edge adder signal is less than a presence threshold. The presence detector detects the presence state in response to determining the edge adder signal is greater than or equal to the presence threshold.

As the true absence state and the presence state are detected based on the edge adder signal instead of a value proportional to the amount of infrared light detected by the infrared sensor, the human presence detection is not susceptible to changes in the ambient temperatures.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known details of electronic devices and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, more human presence detection systems are starting to utilize infrared sensors to perform human presence detection. Unfortunately, infrared sensors are susceptible to changes in the ambient temperature. The presence of heat sources (e.g., sunlight, heaters, etc.) and cold sources (e.g., coolers, refrigerators, etc.) often cause drifts in the detection signals of the infrared sensors.

The present disclosure is directed to devices configured to perform human presence detection with an infrared sensor, and methods for performing the same. The human presence detection disclosed herein utilizes signal regularization and edge detection to minimize the effect of drift on the human presence detection. The human presence detection is accurate regardless of changes in ambient temperature.

Figure 1:
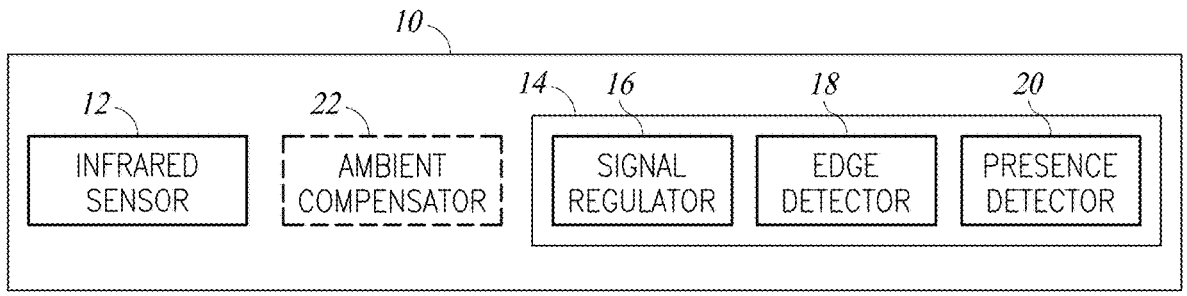
FIG. 1 is a block diagram of a device according to an embodiment disclosed herein.

FIG. 1 is a block diagram of a device 10 according to an embodiment disclosed herein. The device 10 may be any type of electronic device that utilizes human presence detection, such as a personal electronic device, a domestic appliance, a vehicle, and a building access management system.

The device 10 includes an infrared sensor 12 and a human presence detector 14.

The infrared sensor 12 is a thermal metal-oxide-semiconductor (TMOS) infrared sensor solution configured to detect human presence. The TMOS is sensitive to and detects infrared radiation or light emitted by a person in a field of view (FoV) of the infrared sensor 12.

In contrast to some proximity sensors, the infrared sensor 12 does not emit infrared light with an emitter and detect reflected infrared light with a photo detector. Rather, when a person enters in the FoV, the infrared sensor 12 detects the infrared light emitted by the person, and generates a detection signal indicating the amount of infrared light received by the infrared sensor 12.

The detection signal is proportional to the amount of infrared light detected by the infrared sensor 12. Generally, the infrared sensor 12 generates a signal that is proportional to the infrared radiation generated by a person in the FoV. If a person is in the FoV, the infrared sensor 12 generates a higher or larger detection signal. Conversely, if no person is in the FoV, the infrared sensor 12 generates a lower or smaller detection signal.

The infrared sensor 12 is fabricated using, for example, a complementary metal-oxide semiconductor silicon on insulator (CMOS SOI) process. For example, a TMOS transistor is fabricated in an integrated circuit die including a material that is transparent to infrared light. As such, infrared light is able to pass through the die to the TMOS transistor, and is absorbed by the TMOS transistor.

The transconductance of the TMOS transistor is highly sensitive to temperature. Infrared light absorbed by the TMOS transistor results in changes in temperature in the TMOS transistor, which in turn, results in changes in the transconductance of the transistor. The infrared sensor 12 generates and outputs detection signals based on electrical signals (e.g., voltage and current signals) of the TMOS transistor that are proportional to the amount of infrared light absorbed by the TMOS transistor.

The infrared sensor 12 is highly accurate and has low power consumptions compared to traditional infrared sensors that utilize infrared receivers (e.g., photo detectors, photo diodes, etc.). In addition, the infrared sensor 12 permits cost reduction because high-cost optical components, such as Fresnel lenses, are unnecessary.

The human presence detector 14 is communicatively coupled to the infrared sensor 12. The human presence detector 14 is configured to perform human presence detection based on the detection signal generated by the infrared sensor 12.

The human presence detector 14 includes a signal regulator 16, an edge detector 18, and a presence detector 20. The human presence detector 14, including its components (e.g., the signal regulator 16, the edge detector 18, and the presence detector 20), may be implemented in a processor, circuitry, or in the infrared sensor 12 itself. The functions of the human presence detector 14 may also be performed by a processor executing a program, which is stored in a memory coupled to the processor.

The signal regulator 16 receives the detection signal generated by the infrared sensor 12. As discussed above, the detection signal is proportional to the amount of infrared light detected by the infrared sensor 12. The signal regulator 16 implements regularization in pre-defined non-overlapping time windows to reject or at least minimize noise in the detection signal.

The signal regulator 16 performs signal regularization on the detection signal by determining the mean of the detection signal in each of the pre-defined time windows. As a result, the regulated detection signal is composed of a series of mean values computed in respective pre-defined time windows of the detection signal. The signal regulator 16 provides the regulated detection signal to the edge detector 18.

The signal regulator 16 may also denoise the detection signal in each of the pre-defined time windows using other techniques, such as Total Variation Denoising. However, utilization of the mean of the detection signal has reduced power consumption compared to other techniques.

As discussed above, the signal regulator 16 regulates the detection signal generated by and received from the infrared sensor 12. In another embodiment, the signal regulator 16 receives and performs processing as discussed above on a compensated detection signal, instead of the detection signal received from the infrared sensor 12. In this embodiment, as shown in FIG. 1, the device 10 includes an ambient compensator 22. The ambient compensator 22 may also be included in the human presence detector 14.

The ambient compensator 22 is configured to perform ambient compensation on the detection signal generated by the infrared sensor 12 in order to compensate for ambient temperatures at least partially. For example, the detection signal may be calibrated according to known conditions of the device. Other ambient compensation techniques are also possible. The ambient compensator 22 may be implemented in a processor, circuitry, or in the infrared sensor 12 itself. The functions of the ambient compensator 22 may also be performed by a processor executing a program, which is stored in a memory coupled to the processor.

The edge detector 18 receives the regulated detection signal from the signal regulator 16, and performs edge detection based on the regulated detection signal. The edge detector 18 validates edges of the regulated detection signal compatible with events like entering or exiting of people from the FoV of the infrared sensor 12, and rejects drifts in the regulated detection signal caused by changing environmental conditions in the FoV. An edge of the regulated detection signal is a transition of the regulated detection signal, such as a rising edge and falling edge, that jumps from a first signal level to a second signal level substantially greater than or smaller than the first signal level (e.g., the signal level of the regulated detection signal changes by a determined amount).

First, the edge detector 18 determines whether the absolute value of a step of the regulated detection signal exceeds an edge start threshold. This step is considered as the first step of the edge. A step of the regulated detection signal is a change in the value of the regulated detection signal. A step of the regulated detection signal occurs at the end of each pre-defined time window in which the mean of the detection signal is computed. A single or multiple consecutive steps may correspond to a rising or falling edge compatible with an event like a person entering into or exiting from the FoV of the infrared sensor 12.

Second, in response to determining the absolute value of the step of the regulated detection signal exceeds the edge start threshold, the edge detector 18 starts incrementing an edge adder signal by the value (e.g., amplitude) of the step of the regulated detection signal (decrementing in case the value of the step is negative). The edge detector 18 then continues to monitor the regulated detection signal and increment the edge adder signal by the value of the steps of the regulated detection signal. The edge adder signal is continuously incremented (or decremented) by the value of the step until stopped as discussed below.

Third, the edge detector 18 determines whether the absolute value of a step of the regulated detection signal is less than an edge end threshold or whether the sign (e.g., positive or negative) of the value of the step is not the same as the sign of the value of the first step of the edge. In one embodiment, the edge end threshold is less than the edge start threshold.

Fourth, in response to determining the absolute value of the step of the regulated detection signal is less than the edge end threshold or the sign of the value of the step is not the same as the sign of the value of the first step of the edge, the edge detector 18 stops incrementing the edge adder signal.

The presence detector 20 performs presence detection based on the edge adder signal. The presence detector 20 monitors the edge adder signal in order to detect a true absence state and a presence state. The true absence state indicates that no person is in the FoV of the infrared sensor 12. Conversely, the presence state indicates a person is in the FoV of the infrared sensor 12. The presence detector 20 monitors the edge adder signal generated as discussed above. In one embodiment, the presence detector 20 is implemented by a state machine.

The presence detector 20 determines whether the edge adder signal is greater than or equal to a presence threshold. In response to determining the edge adder signal is greater than or equal to the presence threshold, the presence detector 20 detects and outputs the presence state. In response to determining the edge adder signal is less than the presence threshold, the presence detector 20 detects and outputs the true absence state. When the edge detector 18 stops incrementing the edge adder signal, the edge adder signal is reset to 0 if it does not exceed the presence threshold.

As the true absence state and the presence state are detected based on the edge adder signal instead of simply a value proportional to the amount of infrared light detected by the infrared sensor 12, the human presence detection performed by the device is not susceptible to changes in the ambient temperatures.

The device may subsequently perform other processing based on the absence state and the presence state. For example, the device may enter a low power state in response to the absence state being detected, and enter an active state in response to the presence state being detected.

In one embodiment, while the presence state is detected, the presence detector 20 performs static absence detection. Namely, the presence detector 20 detects a static absence state. The static absence state is a state in between the true absence state and the presence state in which a person in the FoV of the infrared sensor 12 is no longer moving. For example, the static absence state may indicate that the person in the FoV is standing still for a short amount of time.

After the presence state has been detected, the presence detector 20 determines whether the detection signal generated by the infrared sensor 12 includes a substantial amount of noise, which indicates movement by the person in the FoV. Namely, the presence detector 20 determines whether a noise level of the detection signal is lower than a determined noise threshold value for a determined amount of time. The noise level may be determined using any technique used to indicate an amount of variation in the detection signal. For example, the noise level may be determined by calculating an average signal of the detection signal with a very slow moving-average filter, subtracting the average signal from the detection signal itself, and checking if the signal obtained from this subtraction exceeds a pre-defined noise threshold. In response to determining the noise level of the detection signal is lower than the determined noise threshold value for the determined amount of time, the presence detector 20 detects the static absence state.

After the static absence state is detected, the presence detector 20 detects the presence state or the true absence state again. The presence detector 20 detects the presence state in response to determining a noise level of the detection signal is not lower than the determined noise threshold value for another determined very short amount of time (indicating movement by the person in the FoV). The presence detector 20 detects the true absence state in response to determining a noise level of the detection signal is lower than the determined noise threshold value for another determined very long amount of time (indicating no movement by the person in the FoV) (e.g., longer than the determined very short amount of time).

Figure 2:
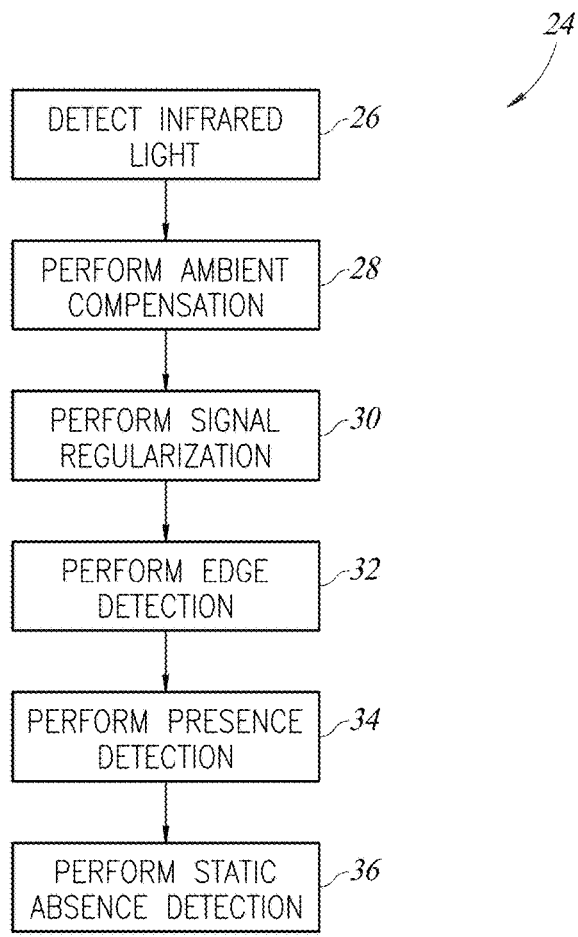
FIG. 2 is a flow diagram of a human presence detection method according to an embodiment disclosed herein.

FIG. 2 is a flow diagram of a human presence detection method 24 according to an embodiment disclosed herein.

In block 26, the infrared sensor 12 detects infrared light, and generates a detection signal. The detection signal is proportional to the amount of infrared light detected by the infrared sensor 12.

In block 28, the ambient compensator 22 performs ambient compensation on the detection signal. As discussed above, the ambient compensation compensates for ambient temperatures at least partially. Block 28 may be removed in some embodiments.

In block 30, the signal regulator 16 performs signal regularization on the detection signal (or the compensated detection signal). For example, the signal regulator 16 determines the mean of the detection signal in each of the pre-defined time windows. As a result, the regulated detection signal is composed of a series of mean values computed in respective pre-defined time windows of the detection signal.

In block 32, the edge detector 18 performs edge detection on the detection signal. As discussed above, edge detection includes determining the edge adder signal. The edge detector 18 starts incrementing an edge adder signal by the value of the steps of the regulated detection signal in response to the absolute value of a step of the regulated detection signal being greater than the edge start threshold (decrementing in case the value of the step is negative), and stops incrementing the edge adder signal in response to the absolute value of a step of the regulated detection signal being less than the edge end threshold or in response to the sign of the value of a step not being the same as the sign of the value of the first step of the edge.

In block 34, the presence detector 20 performs presence detection based on the edge adder signal. In response to the edge adder signal being greater than or equal to the presence threshold, the presence detector 20 detects and outputs the presence state. In response to the edge adder signal being less than the presence threshold, the presence detector 20 detects and outputs the true absence state. When the edge detector 18 stops incrementing the edge adder signal, the edge adder signal is reset to 0 if it does not exceed the presence threshold.

In block 36, the presence detector 20 performs static absence detection. In response to a noise level of the detection signal being lower than the determined noise threshold value for the determined amount of time, the presence detector 20 detects the static absence state.

Once the static absence state is detected, the presence detector 20 detects the presence state or the true absence state again. The presence detector 20 detects and outputs the presence state in response to a noise level of the detection signal being not lower than the determined noise threshold value for another determined very short amount of time. The presence detector 20 detects and outputs the true absence state in response to a noise level of the detection signal being lower than the determined noise threshold value for another determined very long amount of time.

Block 36 may be removed in some embodiments.

Figure 3:
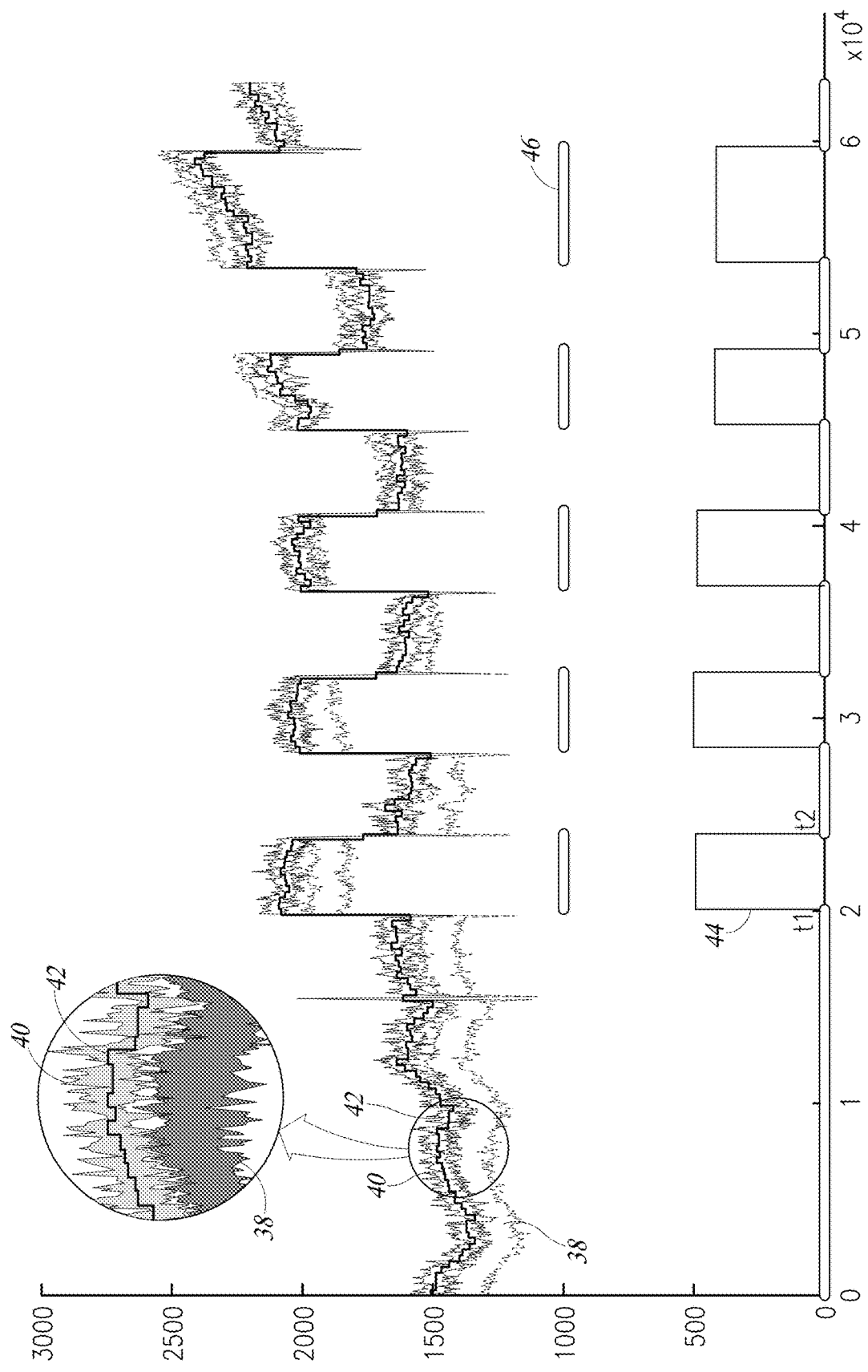
FIG. 3 is a signal diagram of signals during human presence detection according to an embodiment disclosed herein.

FIG. 3 is a signal diagram of signals during human presence detection according to an embodiment disclosed herein. The horizontal axis is a time axis that indicates time or a number of samples. The horizontal axis may have any type of time unit, such as seconds, number of samples, etc. The vertical axis is an amplitude axis that indicates amplitude of signals of the device 10. The vertical axis may have any type of amplitude unit, such as volts, amps, an analog-to-digital (ADC) output, or a binary output.

The signal diagram shows a detection signal 38, a compensated detection signal 40, a regulated detection signal 42, an edge adder signal 44, and a presence signal 46 generated by the presence detector 20 based on the edge adder signal 44.

The detection signal 38 is generated by the infrared sensor 12 in block 26.

The compensated detection signal 40 is the detection signal 38 compensated by the ambient compensator 22 in block 28. As shown in FIG. 3, the amplitude of the compensated detection signal 40 is slightly adjusted to ambient temperatures.

The regulated detection signal 42 is the compensated detection signal 40 regulated by the signal regulator 16 in block 30. As shown in FIG. 3, the regulation of the compensated detection signal 40 minimizes the amount of noise in the compensated detection signal 40, and, thus, results in a much more stable signal.

The edge adder signal 44 is generated by the edge detector 18 based on the regulated detection signal 42 in block 32. For example, at time t1, the regulated detection signal 42 has a rising step and the absolute value of the step rises above an edge start threshold. As a result, at time t1, the edge adder signal 44 is incremented by the value of the step of the regulated detection signal 42.

When the signal regulator 16 computes the next step, the edge detector 18 stops incrementing the edge adder signal since the absolute value of the step is less than the edge end threshold. All the other steps up to t2 are not added to the edge adder signal since the absolute value of none of them exceeds the edge start threshold.

Finally, at time t2, the regulated detection signal 42 has a falling step and the absolute value of the step rises above an edge start threshold. As a result, at time t2, the edge adder signal 44 is decremented by the value of the step of the regulated detection signal 42.

The presence signal 46 is generated by the presence detector 20 based on the edge adder signal 44 in block 34. For example, at time t1, the edge adder signal 44 is greater than or equal to a presence threshold. As a result, the presence signal 46 is set to a high state to indicate a presence state. In contrast, at time t2 the edge adder signal 44 is less than the presence threshold. As a result the presence signal 46 is set to a low state to indicate the true absence state and the edge adder signal 44 is reset to 0.

The various embodiments disclosed herein provide a device and method for human presence detection. The human presence detection disclosed herein utilizes an infrared sensor to detect a presence of a person and performs signal regularization and edge detection to minimize the effect of drift on the detection signal of the infrared sensor. The human presence detection is accurate regardless of changes in ambient temperature.

A device, may be summarized as including an infrared sensor having a field of view, the infrared sensor configured to measure infrared light emitted by a person in the field of view, and generate a detection signal proportional to the measured infrared light; and a human presence detector including: a signal regulator configured to regulate the detection signal; an edge detector configured to start incrementing an edge adder signal in response to an absolute value of a step of the regulated detection signal being greater than a first threshold, and stop incrementing the edge adder signal in response to an absolute value of a step of the regulated detection signal being less than a second threshold or in response to a sign of a value of a step being different from a sign of a value of a first step of an edge; and a presence detector configured to detect a presence state and an absence state based on the edge adder signal.

The infrared sensor may be a thermal metal-oxide-semiconductor infrared sensor.

The signal regulator may be configured to remove noise from the detection signal.

The presence detector may be configured to detect the presence state in response to the edge adder signal being greater than or equal to a presence threshold, and detect the absence state in response to the edge adder signal being less than the presence threshold.

The presence state may indicate a person is in the field of view of the infrared sensor, and the absence state may indicate that no person is in the field of view of the infrared sensor.

In response to the presence state being detected, the presence detector may be configured to detect a static absence state based on the detection signal.

The static absence state may indicate a person in the field of view of the infrared sensor is not moving.

The presence detector may be configured to detect the static absence state in response to a noise level of the detection signal being lower than a noise threshold value for a determined amount of time.

In response to the static absence state being detected, the presence detector may be configured to detect another presence state and another absence state based on the detection signal.

The presence detector may be configured to detect the another presence state in response to a noise level of the detection signal being greater than a noise threshold value for a first determined amount of time, and detect the another absence state in response to the noise level of the detection signal being less than the noise threshold value for a second determined amount of time longer than the first determined amount of time.

The device may further include: an ambient compensator configured to compensate the detection signal for ambient temperatures.

A method may be summarized as including: measuring, by an infrared sensor having a field of view, infrared light emitted by a person in the field of view; generating, by the infrared sensor, a detection signal proportional to the measured infrared light; regulating, by a signal regulator, the detection signal; starting, by an edge detector, incrementing an edge adder signal in response to an absolute value of a step of the regulated detection signal being greater than a first threshold; stopping, by the edge detector, incrementing the edge adder signal in response to an absolute value of a step of the regulated detection signal being less than a second threshold or in response to a sign of a value of a step being different from a sign of a value of a first step of an edge; and detecting, by a presence detector, a state selected from a presence state and a true absence state based on the edge adder signal.

The infrared sensor may be a thermal metal-oxide-semiconductor infrared sensor.

Detecting of the state may include: detecting the presence state in response to the edge adder signal being greater than or equal to a presence threshold; and detecting the absence state in response to the edge adder signal being less than the presence threshold.

The presence state may indicate a person is in the field of view of the infrared sensor, and the absence state may indicate that no person is in the field of view of the infrared sensor.

The method may further include: in response to the presence state being detected, detecting a static absence state based on a noise level of the detection signal, the static absence state indicates a person in the field of view of the infrared sensor is not moving.

The method may further include: in response to the static absence state being detected, detecting another state selected from the presence state and the absence state based on a noise level of the detection signal.

A device may be summarized as including: a memory; and a processor coupled to the memory, wherein the processor, in operation: receives a detection signal from an infrared sensor, the detection signal being proportional to infrared light measured by the infrared sensor; regulates the detection signal; starts incrementing an edge adder signal in response to an absolute value of a step of the regulated detection signal being greater than a first threshold; stops incrementing the edge adder signal in response to an absolute value of a step of the regulated detection signal being less than a second threshold or in response to a sign of a value of a step being different from a sign of a value of a first step of an edge; and detects a state selected from a presence state and a true absence state based on the edge adder signal.

The processor, in operation: may detect the presence state in response to the edge adder signal being greater than or equal to a presence threshold; and may detect the absence state in response to the edge adder signal being less than the presence threshold.

The presence state may indicate a person is in a field of view of the infrared sensor, and the absence state may indicate that no person is in the field of view of the infrared sensor.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    an infrared sensor having a field of view, the infrared sensor configured to measure infrared light emitted by a person in the field of view, and generate a detection signal proportional to the measured infrared light; and
    a human presence detector including:
        a signal regulator configured to regulate the detection signal;
        an edge detector configured to:
            start incrementing an edge adder signal in response to an absolute value of a first step of the regulated detection signal being greater than a first threshold, the first step being a change of the regulated detection signal between two different amplitude levels, and
            stop incrementing the edge adder signal in response to an absolute value of a second step of the regulated detection signal being less than a second threshold or in response to a sign of a value of the second step being different from a sign of a value of the first step, the second step being a change of the regulated detection signal between two different amplitude levels; and
        a presence detector configured to detect a presence state and an absence state based on the edge adder signal.

2. The device of claim 1 wherein the infrared sensor is a thermal metal-oxide-semiconductor infrared sensor.

3. The device of claim 1 wherein the signal regulator is configured to remove noise from the detection signal.

4. The device of claim 1 wherein the presence detector is configured to detect the presence state in response to the edge adder signal being greater than or equal to a presence threshold, and detect the absence state in response to the edge adder signal being less than the presence threshold.

5. The device of claim 1 wherein the presence state indicates a person is in the field of view of the infrared sensor, and the absence state indicates that no person is in the field of view of the infrared sensor.

6. The device of claim 1 wherein, in response to the presence state being detected, the presence detector is configured to detect a static absence state based on the detection signal.

7. The device of claim 6 wherein the static absence state indicates a person in the field of view of the infrared sensor is not moving.

8. The device of claim 6 wherein the presence detector is configured to detect the static absence state in response to a noise level of the detection signal being lower than a noise threshold value for a determined amount of time.

9. The device of claim 6 wherein, in response to the static absence state being detected, the presence detector is configured to detect another presence state and another absence state based on the detection signal.

10. The device of claim 9 wherein the presence detector is configured to detect the another presence state in response to a noise level of the detection signal being greater than a noise threshold value for a first determined amount of time, and detect the another absence state in response to the noise level of the detection signal being less than the noise threshold value for a second determined amount of time longer than the first determined amount of time.

11. The device of claim 1, further comprising:
    an ambient compensator configured to compensate the detection signal for ambient temperatures.

12. A method, comprising:
    measuring, by an infrared sensor having a field of view, infrared light emitted by a person in the field of view;

generating, by the infrared sensor, a detection signal proportional to the measured infrared light;

regulating, by a signal regulator, the detection signal;

starting, by an edge detector, incrementing an edge adder signal in response to an absolute value of a step of the regulated detection signal being greater than a first threshold;

stopping, by the edge detector, incrementing the edge adder signal in response to an absolute value of a step of the regulated detection signal being less than a second threshold or in response to a sign of a value of a step being different from a sign of a value of a first step of the edge adder signal; and detecting, by a presence detector, a state selected from a presence state and an absence state based on the edge adder signal;

in response to the presence state being detected, detecting a static absence state based on a noise level of the detection signal, the static absence state indicates a person in the field of view of the infrared sensor is not moving; and in response to the static absence state being detected, detecting another state selected from the presence state and the absence state based on a noise level of the detection signal.

13. The method of claim 12 wherein the infrared sensor is a thermal metal-oxide-semiconductor infrared sensor.

14. The method of claim 12 wherein detecting of the state includes:

detecting the presence state in response to the edge adder signal being greater than or equal to a presence threshold; and detecting the absence state in response to the edge adder signal being less than the presence threshold.

15. The method of claim 12 wherein the presence state indicates a person is in the field of view of the infrared sensor, and the absence state indicates that no person is in the field of view of the infrared sensor.

16. A device, comprising:

a memory; and a processor coupled to the memory, wherein the processor, in operation:

receives a detection signal from an infrared sensor, the detection signal being proportional to infrared light measured by the infrared sensor;

regulates the detection signal;

starts incrementing an edge adder signal in response to an absolute value of a step of the regulated detection signal being greater than a first threshold;

stops incrementing the edge adder signal in response to an absolute value of a step of the regulated detection signal being less than a second threshold or in response to a sign of a value of a step being different from a sign of a value of a first step of an edge;

detects a presence state in response to the edge adder signal being greater than or equal to a presence threshold; and detects an absence state in response to the edge adder signal being less than the presence threshold.

17. The device of claim 16 wherein the presence state indicates a person is in a field of view of the infrared sensor, and the absence state indicates that no person is in the field of view of the infrared sensor.

18. The device of claim 1 wherein the edge adder signal is incremented by a value of the first step in response to the incrementing of the edge adder signal being started.

* * * * *